(12) United States Patent
Abou Mahmoud et al.

(10) Patent No.: US 10,339,185 B2
(45) Date of Patent: Jul. 2, 2019

(54) EFFICIENT MANAGEMENT OF DOCUMENT CORPUS

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 15/402,299

(22) Filed: Jan. 10, 2017

(65) Prior Publication Data
US 2018/0196802 A1 Jul. 12, 2018

(51) Int. Cl.
*G06F 16/93* (2019.01)
*G06F 17/22* (2006.01)

(52) U.S. Cl.
CPC .......... *G06F 16/93* (2019.01); *G06F 17/2211* (2013.01); *G06F 17/2229* (2013.01)

(58) Field of Classification Search
None
See application file for complete search history.

(56) References Cited

U.S. PATENT DOCUMENTS

| | | | |
|---|---|---|---|
| 5,963,940 A * | 10/1999 | Liddy | ............... G06F 17/30654 |
| 7,555,472 B2 | 6/2009 | Craig et al. | |
| 7,752,208 B2 | 7/2010 | Amitay et al. | |
| 8,533,280 B1 | 9/2013 | Clarke et al. | |
| 8,607,140 B1 | 12/2013 | Pascovici et al. | |
| 9,009,146 B1 * | 4/2015 | Lopatenko | ........ G06F 17/30867 707/723 |
| 9,330,191 B2 | 5/2016 | Teevan et al. | |
| 9,348,815 B1 | 5/2016 | Estes et al. | |

(Continued)

OTHER PUBLICATIONS

Conrad, Jack G., et al., "Constructing a Text Corpus for Inexact Duplicate Detection"; SIGIR '04; Jul. 25-29, 2004; Sheffield, UK.

(Continued)

*Primary Examiner* — Wilson Lee
(74) *Attorney, Agent, or Firm* — North Shore Patents, P.C.; Michele Liu Baillie

(57) ABSTRACT

In monitoring changes to a document corpus, a document system extracts elements from a plurality of documents in the document corpus by the document system and establishes links between the elements to form an initial set of inter-document relationships for the plurality of documents in the document corpus by the document system. When a new document is added to the document corpus, the document system extracts a new set of elements from the new document by the document system and compares the new set of elements with the elements corresponding to the plurality of documents in the document corpus. The document system determines whether any existing inter-documents relationships in the initial set of inter-document relationships is changed by the new document, and responsive to determining that a given existing inter-document relationship is changed, modifies the given existing inter-document relationship based on the change.

17 Claims, 3 Drawing Sheets

(56) References Cited

U.S. PATENT DOCUMENTS

| | | | |
|---|---|---|---|
| 2003/0233224 A1* | 12/2003 | Marchisio | G06F 17/271 704/4 |
| 2006/0053174 A1 | 3/2006 | Gardner et al. | |
| 2006/0059121 A1 | 3/2006 | Zhang et al. | |
| 2010/0153324 A1* | 6/2010 | Downs | G06F 17/2745 706/21 |
| 2011/0025842 A1* | 2/2011 | King | G06F 17/211 348/135 |
| 2011/0029443 A1* | 2/2011 | King | G06K 9/228 705/310 |
| 2011/0225159 A1* | 9/2011 | Murray | G06F 17/30713 707/739 |
| 2012/0117082 A1* | 5/2012 | Koperda | G06F 17/30657 707/748 |
| 2015/0324350 A1 | 11/2015 | Bufe | |
| 2015/0350139 A1* | 12/2015 | Speer | H04L 51/16 709/206 |
| 2016/0012057 A1* | 1/2016 | Franceschini | G06F 17/30734 707/730 |
| 2016/0012336 A1* | 1/2016 | Franceschini | G06F 17/30616 706/55 |
| 2016/0098456 A1* | 4/2016 | Contreras | G06F 17/30551 705/3 |
| 2016/0217128 A1* | 7/2016 | Baum | G06F 17/2775 |

OTHER PUBLICATIONS

Mullen, Lincoln; "Textreuse: Detect Text Reuse and Document Similarity"; http://hdl.handle.net/1920/10077; Nov. 2015.

\* cited by examiner

EFFICIENT MANAGEMENT OF DOCUMENT CORPUS

BACKGROUND

Many customers depend on files stored on a system into a corpora to drive business. Files, such as documents defining relevant specifications, rules, regulations, and customer presentations, exist in many forms, such as a Microsoft Word™ document, a HTML file, a Latex file, etc. As these files are created and/or updated, the previous versions are rarely removed from the system. Even when a file is updated, it is infrequently updated within a reasonable time window. As a result, decisions may be made using out-of-date information. Further, space may be consumed by the out-of-date documents. Example scenarios may include: multiple versions of the same translated document; conflicts between versions of the same document; multiple versions of a document over its lifecycle (e.g. draft vs final); and invalid co-references within a document due to changes in other document(s).

SUMMARY

Disclosed herein is a method for monitoring changes to a document corpus in a document system and a computer program product as specified in the independent claims. Embodiments of the present invention are given in the dependent claims. Embodiments of the present invention can be freely combined with each other if they are not mutually exclusive.

According to an embodiment of the present invention, monitoring changes to a document corpus, a document system extracts elements from a plurality of documents in the document corpus by the document system and establishes links between the elements to form an initial set of inter-document relationships for the plurality of documents in the document corpus by the document system. When a new document is added to the document corpus, the document system extracts a new set of elements from the new document by the document system and compares the new set of elements with the elements corresponding to the plurality of documents in the document corpus. The document system determines whether any existing inter-documents relationships in the initial set of inter-document relationships is changed by the new document, and responsive to determining that a given existing inter-document relationship is changed, modifies the given existing inter-document relationship based on the change.

DETAILED DESCRIPTION

Figure 1:
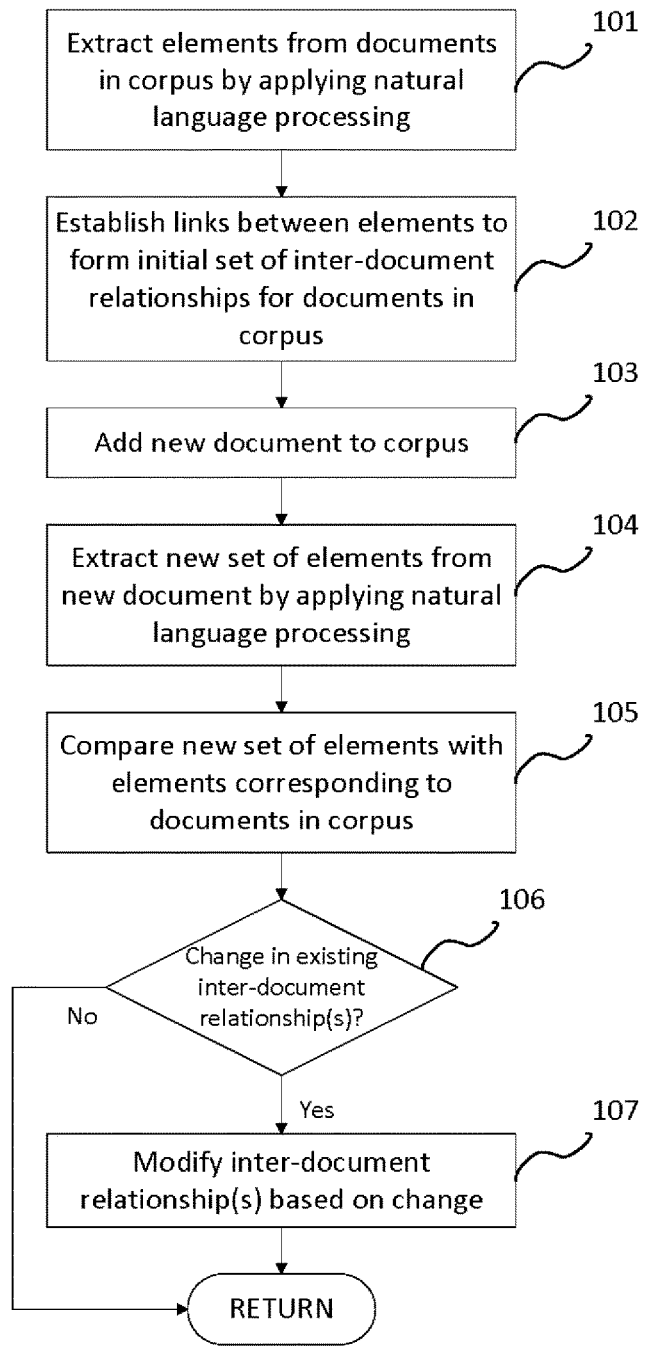
FIG. 1 illustrates a method for monitoring changes to a document corpus in a document system according to embodiments of the present invention.

FIG. 1 illustrates a method for monitoring changes to a document corpus in a document system according to embodiments of the present invention. The document system manages the storage of a corpus of documents, as described herein. By applying natural language processing, the document system extracts elements from the documents in the corpus (101). Links between the elements are established to form an initial set of inter-document relationships for the documents in the corpus (102). When a new document is added to the corpus (103), the document system extracts a new set of elements from the new document, also by applying natural language processing (104). The document system then compares the new elements with the elements corresponding to the documents in the corpus (105), and in addition to creating inter-document relationships between the new document and one or more documents in the corpus, determines whether the comparison indicates any changes to existing inter-document relationships for the documents in the corpus (106). For each existing inter-document relationship that the comparison indicates has changed, the document system modifies the existing inter-document relationship based on the change (107).

Figure 2:
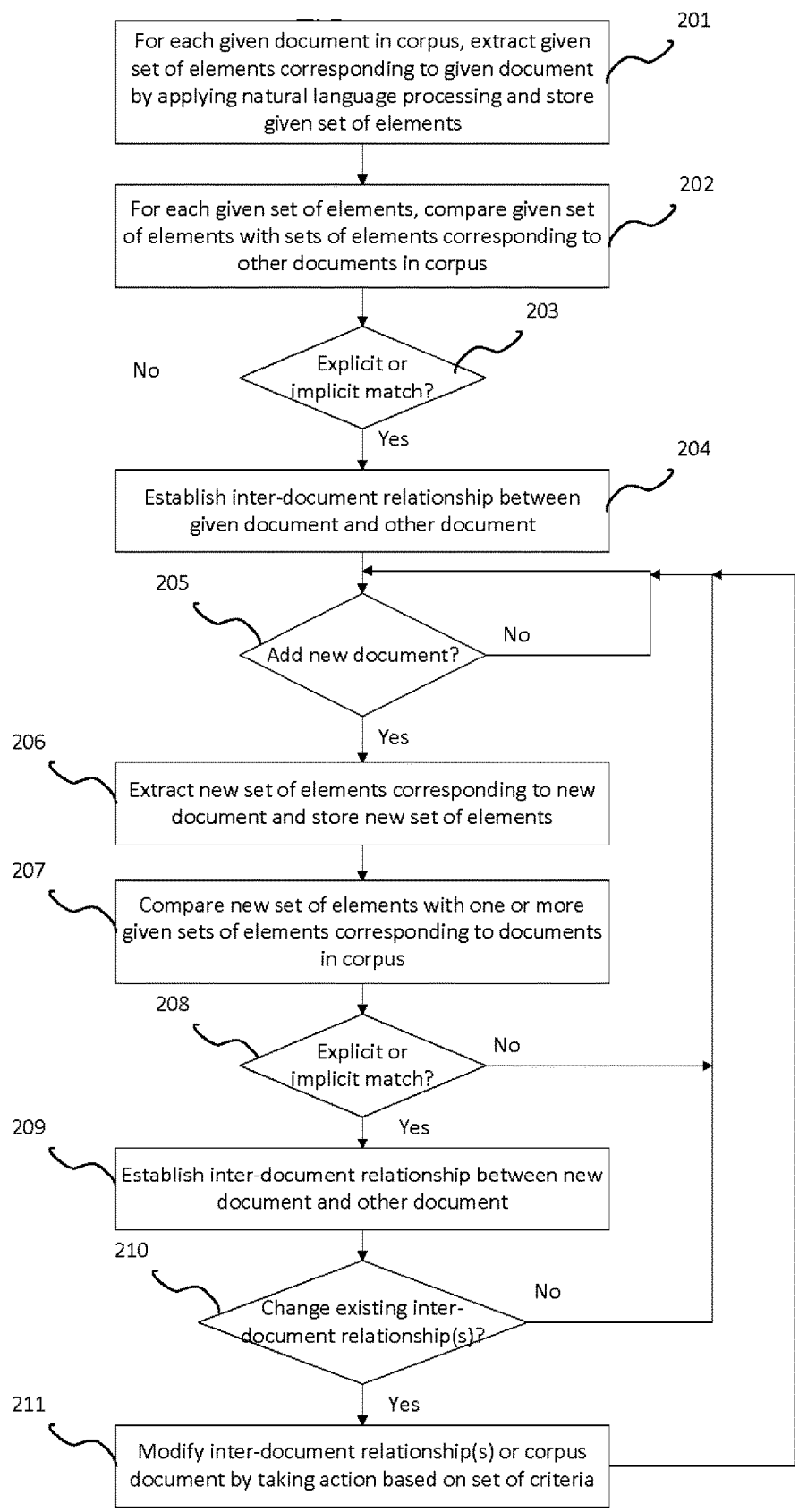
FIG. 2 illustrates in more detail the method for monitoring changes to a document corpus in a document system according to embodiments of the present invention.

FIG. 2 illustrates in more detail the method for monitoring changes to a document corpus in a document system according to embodiments of the present invention. First, for each given document in the corpus, the document system extracts a given set of elements corresponding to the given document, by applying natural language processing, and stores the given set of elements (201). In this illustrated embodiment, the document system may use natural language processing techniques to extract words, phrases, sentences, paragraphs, and/or pages of media from the given document as elements. The extracted elements may be represented by n-grams or template based summarizations of the content (e.g., subject-verb and subject-verb-adverb). Each given set of elements may be stored in a datastore coupled to the document system.

For each given set of elements, the document system compares the given set of elements corresponding to the given document with the sets of elements corresponding to the other documents in the corpus (202). The document system determines whether there are any explicit matches (203). For example, the given document may contain a citation to another document in the corpus, or vice versa, where the citation is captured as part of the set of elements. The citation results in an explicit match. The document system then establishes an inter-document relationship between the given document and the other document (204). Optionally, this inter-document relationship may include a direction for the citation (i.e., whether the given document cites the other document or the other document cites the given document). Other types of citations may be the basis of an explicit match without departing from the spirit and scope of the present invention. Optionally, the document system may place a specific priority on the elements that are based on citations. For example, a first document may be given a higher priority or value than a second document because the first document contains a higher number of citations.

The document system further determines whether there are any implicit matches between the set of elements corresponding to the given document and the sets of elements corresponding to the other documents in the corpus (203). Here, implicit matches may be identified based on one or more shared elements between two documents. Implicit matches thus can capture documents with related contents. Optionally, the document system may be configured to ignore known template or boilerplate language. When an implicit match is identified, the document system establishes an inter-document relationship between the given document and the other document (204).

The document system then monitors changes to the corpus in order to monitor changes to the inter-document relationships identified above. When a new document is added to the corpus (205), the document system extracts a new set of elements corresponding to the new document, in a manner similar to step 201, and stores the new set of elements (206). The document system compares the new set of elements with the one or more given sets of elements corresponding to the documents in the corpus, in a manner similar to step 202 (207). The document system identifies explicit and implicit matches, in a manner similar to steps 203 and 204 (208). The document system establishes inter-document relationships between the new document and one or more of the other documents in the corpus (209).

The document system also determines whether the inter-relationships between the new document and any of the other documents in the corpus changes or breaks any existing inter-document relationships (210). If the inter-relationships between the new document and another document in the corpus changes or breaks an existing inter-document relationship, then the document system modifies the existing inter-document relationship or the corpus document by taking an action based on a set of criteria (211). For example, a first document may have an existing inter-document relationship with a second document in the corpus, based on similar author-subject-version-date combinations (i.e., based on an explicit match). Assume that the document system determines that the new document has similar author-subject-version-date combinations with the first document. This indicates the strong possibility that the new document may be a more recent revision than the second document. The document system determines that when these criteria are met, an associated action is to be performed. The criteria-action associations may be preconfigured and defined based on the nature of a change or on the basis of a change. For example, when the new document may be a more recent revision, then the action to be performed is to mark the inter-document relationship between the first and second documents as "suspect" or "need modification". Another possible associated action may be to remove the second document from the corpus in order to avoid mistaken reliance on this outdated version. Other possible actions may include, but are not limited to: composite the new and other documents to create a synthetic document; increase the importance or value of the other document or of a feature within the other document; edit the other document; notify the corpus owner that there are documents to be removed from the corpus; send a request to a document owner to update and reconfirm an inter-document relationship; and push the changes to the corpus back to the originating source.

In one exemplary embodiment, when a document contains tracked changes, a more granular understanding of the differences between the new document and another document may be identified as provided by the track changes. In another exemplary embodiment, a "synthetic" inter-document relationship may be identified based on conversations related to a document. Example sources of the conversations may include, but are not limited to, peer reviews, online social network, forums, and email. The content of the conversations may be used to establish links between documents. The changing nature of the conversations may also be used as a basis for removing a document from the corpus or to mark a document as 'suspect'.

In one exemplary embodiment, the document system may be configured so that a statistical threshold of change between a new document and an existing document in the corpus must be met or exceeded before the association action is executed. For example, assume that a corpus document contains a sentence with a certain number of words, and the new document contains a linked sentence that contains a 50% change. If the 50% change meets or exceeds the threshold, then the associated action (such as removal of the document from the corpus or the marking of the document as 'suspect') is executed. Otherwise, the associated action is not executed.

In one exemplary embodiment, the changes in the existing inter-document relationships may be used to determine viable content in a data source, prior to migration to a second data source. For the above example with the new document being a more recent revision, the second document may be identified as non-viable content since the new document is a more recent revision. The second document thus would not be migrated to the second data source. This reduces the total size or amount of the files which are migrated from the first data source to the second data source.

With reference to FIG. 2, assume the following example scenario:

Document 1 and Document 2 are documents in the corpus. The document system analyzes Document 1 and extracts elements from a sentence, "Lazy Lions never eat on Sunday" (201). N-grams, pairs, and generalized concepts (e.g. Lion-eat) may be generated as elements. The document system also analyzes Document 2 and extracts elements (e.g. Lion-eat) from the sentences, "Lion eating habits are systematically explored. The eating habits are explored weekly, and contain interesting evidence on the eating habits on Sunday." (201). The document system compares the elements corresponding to Documents 1 and 2 (202) and establishes an inter-document relationship between them based on the common element, Lion-eat, between the two documents (203-204). The inter-document relationship may be based on other possible elements, such as "eating-Sunday".

Assume that Document 3, an update to Document 2, is added to the corpus (205). The document system analyzes Document 3 and extracts a new set of elements, including "Lion eating", from a sentence, "Lion eating habits are systematically explored. The eating habits are explored seasonally." (206). In comparing the new set of elements with the elements of Documents 1 and 2, the document system detects similar concepts, "Lion eating" and "Lion-eat", between Documents 1 and 2, and between Documents 2 and 3. The document system also establishes Document 3 as a version of Document 2 (207-208). Based on the date, the document system determines that Document 3 supersedes document 2. The document system establishes an inter-document relationship between Document 1 and Document 3 (209). The document system further determines that the existing inter-document relationship between Documents 1 and 2 is changed due to Document 3 being a superseding version (210). In response, the document system performs the associated action, such as removing Document 2 from the corpus and/or marking Document 1 as 'suspect' (211).

Figure 3:
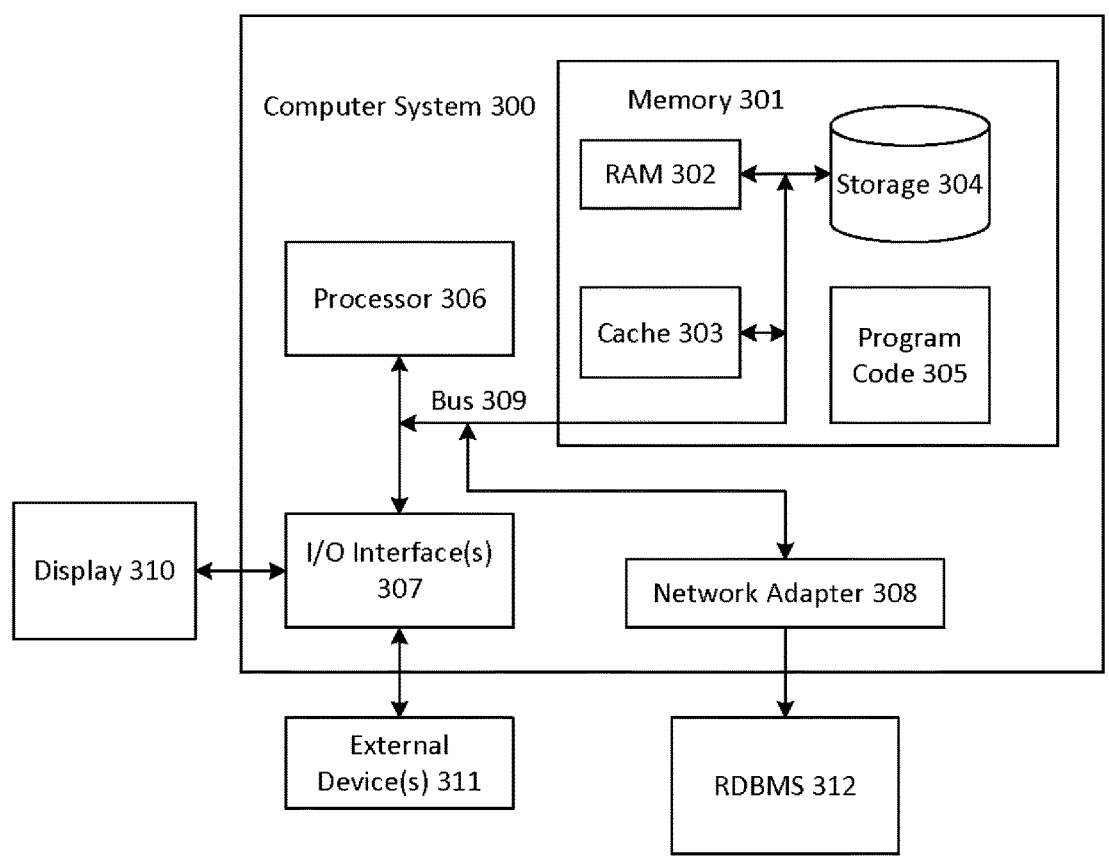
FIG. 3 illustrates the document system implemented as a computer system according to embodiments of the present invention.

The document system may be implemented as a computer system, as illustrated in FIG. 3, according to embodiments of the present invention. The computer system 300 is operationally coupled to a processor or processing units 306, a memory 301, and a bus 309 that couples various system components, including the memory 301 to the processor 306. The bus 309 represents one or more of any of several types of bus structure, including a memory bus or memory controller, a peripheral bus, an accelerated graphics port, and a processor or local bus using any of a variety of bus architectures. The memory 301 may include computer readable media in the form of volatile memory, such as random access memory (RAM) 302 or cache memory 303, or non-volatile storage media 304. The memory 301 may include at least one program product having a set of at least one program code module 305 that are configured to carry out the functions of embodiment of the present invention when executed by the processor 306. The computer system 300 may also communicate with one or more external devices 311, such as a display 310, via I/O interfaces 307. The computer system 300 may communicate with one or more networks via network adapter 308.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a document corpus stored in a document system, comprising:
    extracting elements from a plurality of documents in the document corpus by the document system;
    establishing links between the elements to form an initial set of inter-document relationships for the plurality of documents in the document corpus by the document system;
    adding a new document to the document corpus;
    extracting a new set of elements from the new document by the document system;
    comparing the new set of elements with the elements corresponding to the plurality of documents in the document corpus;
    determining whether any existing inter-documents relationships in the initial set of inter-document relationships is changed by the new document; and
    responsive to determining that a given existing inter-document relationship is changed, modifying a given document of the given existing inter-document relationship by taking an action based on a set of criteria, wherein the set of criteria indicates that the new document is a more recent version of the given document, wherein the action comprises removing the given document from the document corpus stored in the document system.

2. The method of claim 1, wherein the extracting of the elements from the plurality of documents in the document corpus and the establishing of the links between the elements to form the initial set of inter-document relationships comprise:
    for each given document in the plurality of documents in the document corpus, extracting a given set of elements corresponding to the given document by applying natural language processing;
    for each given set of elements, comparing the given set of elements with sets of elements corresponding to other documents of the plurality of documents in the document corpus;
    determining whether an explicit match or an implicit match exists between the given set of elements and at least one set of elements corresponding to at least one other document of the plurality of documents in the document corpus;
    for each explicit match or implicit match, establishing a given inter-document relationship between the given document and the at least one other document of the plurality of documents in the document corpus.

3. The method of claim 1, wherein the extracting of the new set of elements from the new document and the comparing of the new set of elements with the elements corresponding to the plurality of documents in the document corpus comprise:
    extracting the new set of elements corresponding to the new document by applying natural language processing;
    comparing the new set of elements with sets of elements corresponding to other documents of the plurality of documents in the document corpus;
    determining whether an explicit match or an implicit match exists between the new set of elements and at least one set of elements corresponding to at least one other document of the plurality of documents in the document corpus;
    for each explicit match or implicit match, establishing a new inter-document relationship between the new document and the at least one other document of the plurality of documents in the document corpus.

4. The method of claim 3, wherein the explicit match is based on a citation in the new document or the at least one other document of the plurality of documents in the document corpus.

5. The method of claim 3, wherein the implicit match is based on one or more shared elements between the new set of elements corresponding to the new document and the at least one set of elements corresponding to the at least one other document of the plurality of documents in the document corpus.

6. The method of claim 1, wherein the determining whether any existing inter-documents relationships in the initial set of inter-document relationships is changed by the new document is based on one or more differences between the new document and a given document of the given existing inter-document relationship.

7. The method of claim 1, wherein the set of criteria comprises a statistical threshold of change between the new document and the given document of the given existing inter-document relationship.

8. A computer program product for managing a document corpus stored in a document system, the computer program product comprising a non-transitory computer readable storage medium having program instructions embodied therewith, the program instructions executable by a processor to cause the processor to:
    extract elements from a plurality of documents in the document corpus;
    establish links between the elements to form an initial set of inter-document relationships for the plurality of documents in the document corpus;
    add a new document to the document corpus;
    extract a new set of elements from the new document;
    compare the new set of elements with the elements corresponding to the plurality of documents in the document corpus;
    determine whether any existing inter-documents relationships in the initial set of inter-document relationships is changed by the new document; and
    responsive to determining that a given existing inter-document relationship is changed, modify a given document of the given existing inter-document relationship by taking an action based on a set of criteria based on, wherein the set of criteria indicates that the new document is a more recent version of the given document, wherein the action comprises removing the given document from the document corpus stored in the document system.

9. The computer program product of claim 8, wherein the extracting of the elements from the plurality of documents in the document corpus and the establishing of the links between the elements to form the initial set of inter-document relationships comprise:
for each given document in the plurality of documents in the document corpus, extract a given set of elements corresponding to the given document by applying natural language processing;
for each given set of elements, compare the given set of elements with sets of elements corresponding to other documents of the plurality of documents in the document corpus;
determine whether an explicit match or an implicit match exists between the given set of elements and at least one set of elements corresponding to at least one other document of the plurality of documents in the document corpus;
for each explicit match or implicit match, establish a given inter-document relationship between the given document and the at least one other document of the plurality of documents in the document corpus.

10. The computer program product of claim 8, wherein the extracting of the new set of elements from the new document and the comparing of the new set of elements with the elements corresponding to the plurality of documents in the document corpus comprise:
extract the new set of elements corresponding to the new document by applying natural language processing;
compare the new set of elements with sets of elements corresponding to other documents of the plurality of documents in the document corpus;
determine whether an explicit match or an implicit match exists between the new set of elements and at least one set of elements corresponding to at least one other document of the plurality of documents in the document corpus;
for each explicit match or implicit match, establish a new inter-document relationship between the new document and the at least one other document of the plurality of documents in the document corpus.

11. The computer program product of claim 10, wherein the explicit match is based on a citation in the new document or the at least one other document of the plurality of documents in the document corpus.

12. The computer program product of claim 10, wherein the implicit match is based on one or more shared elements between the new set of elements corresponding to the new document and the at least one set of elements corresponding to the at least one other document of the plurality of documents in the document corpus.

13. The computer program product of claim 8, wherein the determining whether any existing inter-documents relationships in the initial set of inter-document relationships is changed by the new document is based on one or more differences between the new document and a given document of the given existing inter-document relationship.

14. The computer program product of claim 8, wherein the set of criteria comprises a statistical threshold of change between the new document and the given document of the given existing inter-document relationship.

15. A system, comprising:
a processor; and
a non-transitory computer readable storage medium having program instructions embodied therewith, the program instructions executable by a processor to cause the processor to:
extract elements from a plurality of documents in the document corpus;
establish links between the elements to form an initial set of inter-document relationships for the plurality of documents in the document corpus;
add a new document to the document corpus;
extract a new set of elements from the new document;
compare the new set of elements with the elements corresponding to the plurality of documents in the document corpus;
determine whether any existing inter-documents relationships in the initial set of inter-document relationships is changed by the new document; and
responsive to determining that a given existing inter-document relationship is changed, modify a given document of the given existing inter-document relationship by taking an action based on a set of criteria , the set of criteria indicates that the new document is a more recent version of the given document, wherein the action comprises removing the given document from the document corpus store din the document system.

16. The system of claim 15, wherein the extracting of the elements from the plurality of documents in the document corpus and the establishing of the links between the elements to form the initial set of inter-document relationships comprise:
for each given document in the plurality of documents in the document corpus, extract a given set of elements corresponding to the given document by applying natural language processing;
for each given set of elements, compare the given set of elements with sets of elements corresponding to other documents of the plurality of documents in the document corpus;
determine whether an explicit match or an implicit match exists between the given set of elements and at least one set of elements corresponding to at least one other document of the plurality of documents in the document corpus;
for each explicit match or implicit match, establish a given inter-document relationship between the given document and the at least one other document of the plurality of documents in the document corpus.

17. The system of claim 15, wherein the extracting of the new set of elements from the new document and the comparing of the new set of elements with the elements corresponding to the plurality of documents in the document corpus comprise:
extract the new set of elements corresponding to the new document by applying natural language processing;
compare the new set of elements with sets of elements corresponding to other documents of the plurality of documents in the document corpus;
determine whether an explicit match or an implicit match exists between the new set of elements and at least one set of elements corresponding to at least one other document of the plurality of documents in the document corpus;
for each explicit match or implicit match, establish a new inter-document relationship between the new document and the at least one other document of the plurality of documents in the document corpus.

* * * * *